United States Patent
Pinto Calabria et al.

(10) Patent No.: US 11,271,829 B1
(45) Date of Patent: Mar. 8, 2022

(54) SLA-AWARE TASK DISPATCHING WITH A TASK RESOLUTION CONTROL

(71) Applicant: KYNDRYL, INC., New York, NY (US)

(72) Inventors: Paulo Cesar Pinto Calabria, Sao Paulo (BR); Robertson Pinto Dias Junior, Itatiba (BR); Niemeyer Souza Barbosa, Vinhedo (BR); William Pereira, Hortolandia (BR); Marco Aurelio Stelmar Netto, Sao Paulo (BR)

(73) Assignee: Kyndryl, Inc., New York, NY (US)

( * ) Notice: Subject to any disclaimer, the term of this patent is extended or adjusted under 35 U.S.C. 154(b) by 0 days.

(21) Appl. No.: 16/952,528

(22) Filed: Nov. 19, 2020

(51) Int. Cl.
| | |
|---|---|
| H04L 12/24 | (2006.01) |
| H04L 41/5074 | (2022.01) |
| H04L 41/507 | (2022.01) |
| H04L 41/5009 | (2022.01) |
| H04L 41/5022 | (2022.01) |
| H04L 41/5025 | (2022.01) |
| H04L 41/5067 | (2022.01) |

(52) U.S. Cl.
CPC ........ *H04L 41/5074* (2013.01); *H04L 41/507* (2013.01); *H04L 41/5016* (2013.01); *H04L 41/5022* (2013.01); *H04L 41/5025* (2013.01); *H04L 41/5067* (2013.01)

(58) Field of Classification Search
CPC .............. H04L 41/5074; H04L 41/507; H04L 41/5022; H04L 41/5016; H04L 41/5067; H04L 41/5025
See application file for complete search history.

(56) References Cited

U.S. PATENT DOCUMENTS

| | | | |
|---|---|---|---|
| 9,172,806 B2 | 10/2015 | Tuchman | |
| 9,318,108 B2 | 4/2016 | Gruber | |
| 9,450,823 B2 | 9/2016 | Arora | |
| 10,015,124 B2 | 7/2018 | Mcgregor, Jr. | |
| 10,235,646 B2* | 3/2019 | Perry | G16H 40/67 |
| 2008/0155564 A1* | 6/2008 | Shcherbina | G06Q 10/04 |
| | | | 719/318 |

(Continued)

FOREIGN PATENT DOCUMENTS

| | | |
|---|---|---|
| JP | 2017224300 A | 12/2017 |
| KR | 101961754 B1 | 3/2019 |

OTHER PUBLICATIONS

Anonymous. "Cognitive Assign." Published Apr. 20, 2019. 4 pages. Published by IP.com. https://priorart.ip.com/IPCOM/000258228.

(Continued)

*Primary Examiner* — Umar Cheema
*Assistant Examiner* — James Ross Hollister
(74) *Attorney, Agent, or Firm* — Schmeiser, Olsen & Watts, LLP; Erik Swanson

(57) ABSTRACT

A processor may receive a new ticket from a ticket management system. The processor may classify, in response to receiving the new ticket, one or more metrics to complete the new ticket. The processor may generate a ticket-metric classification that includes a list of users. The processor may identify a question contained in a digital record of the new ticket. The processor may cluster one or more other tickets into metric levels based on information about the question contained in the digital record of the new ticket. The processor may train a metric model using a database of tickets comprising features extracted from information from the ticket management system. The processor may assign the new ticket to a specific user on the list of users.

17 Claims, 5 Drawing Sheets

(56) References Cited

U.S. PATENT DOCUMENTS

| | | | |
|---|---|---|---|
| 2009/0006164 A1 | 1/2009 | Kaiser | |
| 2012/0226518 A1* | 9/2012 | Haddad | G06Q 10/06316 705/7.28 |
| 2013/0111488 A1* | 5/2013 | Gatti | G06N 20/00 718/103 |
| 2013/0198116 A1* | 8/2013 | Bhamidipaty | G06F 3/04842 706/12 |
| 2014/0025418 A1* | 1/2014 | Huang | G06Q 10/063112 705/7.23 |
| 2014/0188536 A1* | 7/2014 | Dasgupta | G06Q 10/063112 705/7.14 |
| 2015/0371547 A1* | 12/2015 | Hernandez | H04W 4/21 434/350 |
| 2016/0036982 A1* | 2/2016 | Ristock | G06Q 10/04 379/265.1 |
| 2016/0044380 A1 | 2/2016 | Barrett | |
| 2016/0140478 A1* | 5/2016 | Hambrick | G06Q 10/063112 705/7.14 |
| 2016/0219070 A1* | 7/2016 | Vasseur | G06N 20/00 |
| 2017/0005967 A1* | 1/2017 | Simpson | G06Q 10/101 |
| 2017/0243144 A1 | 8/2017 | Nielsen | |
| 2018/0032330 A9* | 2/2018 | Ryali | G06F 16/353 |
| 2018/0329768 A1* | 11/2018 | Bikumala | G06F 11/0751 |
| 2018/0336485 A1* | 11/2018 | Bikumala | G06N 5/04 |
| 2019/0347148 A1* | 11/2019 | Gomes Pereira | G06F 11/079 |
| 2020/0042912 A1 | 2/2020 | Hamilton | |
| 2020/0151648 A1* | 5/2020 | Gorny | G06Q 10/063112 |
| 2020/0160252 A1 | 5/2020 | Sahni | |
| 2020/0175456 A1 | 6/2020 | Dar Mousa | |
| 2021/0014136 A1* | 1/2021 | Rath | H04L 41/5074 |
| 2021/0019648 A1* | 1/2021 | Backas | G06F 40/20 |

OTHER PUBLICATIONS

Anonymous. "Dispatch assignments to available workers using bots" Accessed Sep. 4, 2020. 13 pages. Published by Cerb. https://cerb.ai/guides/bots/dispatch-assignments/.

Anonymous. "Method and System for Automatically Dispatching Tickets." Published Mar. 11, 2010. 3 pages. Published by IP.com. https://priorart.ip.com/IPCOM/000193865.

Anonymous. "Reopening incident." Published Jan. 23, 2020. Printed Jul. 30, 2020. 2 pages. Published by ServiceNow. https://docs.servicenow.com/bundle/orlando-it-service-management/page/product/incident-management/concept/reopening-incident.html.

Anonymous. "Tech Stats Reviewer Bot." Accessed Sep. 10, 2020. 1 page Published by MSP Bots. https://mspbots.ai/tech-stats-reviewer-bot/.

Anonymous. "What is ITIL incident management?" Published Jun. 25, 2020. Printed Jul. 30, 2020. 18 pages. Published by Manage Engine. https://www.manageengine.com/products/service-desk/itil-incident-management/what-is-itil-incident-management.html.

Folstad, A., et al., "Different Chatbots for Different Purposes: Towards a Typology of Chatbots to Understand Interaction Design." Published Apr. 17, 2019. 12 pages. Internet Science. INSCI 2018. Lecture Notes in Computer Science, vol. 11551.Published by Springer. Oslo, Norway. https://sintef.brage.unit.no/sintef-xmlui/bitstream/handle/11250/2595154/chatbot%2Btypology%2B-%2Bauthors%2Bversion.pdf?sequence=2.

Mandal, A., et al., "Automated Dispatch of Helpdesk Email Tickets: Pushing the Limits with AI." Published 2019. Accessed Sep. 4, 2020. 8 pages. The Thirty-First AAAI Conference on Innovative Applications of Artificial Intelligence (IAAI-19). pp 9381-9388. Published by Association for the Advancement of Artificial Intelligence, https://www.aaai.org/ojs/index.php/AAAI/article/view/4986/4859.

Mell, et al., "The NIST Definition of Cloud Computing," Recommendations of the National Institute of Standards and Technology, U.S. Department of Commerce, Special Publication 800-145, Sep. 2011, 7 pgs.

Pelle, I., et al., "One tool to rule them all: a modular troubleshooting framework for SDN (and other) networks." Published Jun. 2015. 4 pages. SOSR '15. Proceedings of the 1st ACM SIGCOMM Symposium on Software Defined Networking Research. Article No. 24. pp. 1-7. Published by ACM Digital Library, https://dl.acm.org/doi/10.1145/2774993.2775014.

* cited by examiner

US 11,271,829 B1

SLA-AWARE TASK DISPATCHING WITH A TASK RESOLUTION CONTROL

BACKGROUND

The present disclosure relates generally to the field of ticket resolution, and more specifically to dispatching a ticket for user metric improvement.

Traditionally, dispatching of activities to IT technicians is performed by a human dispatcher who knows and understands the technicians' skill-sets and capabilities, and matches a technician with the criticality of the activities and expected delivery time frame for task resolution. Such knowledge of a human dispatcher about technicians' skill-sets is increased daily based on response and resolution times from technicians to assigned activities. All this knowledge is accumulated by the human dispatcher but not often converted into a long term asset for an entity as it is usually lost with high technician rotations.

In other cases where dispatching activities are automated by IT systems it is often seen that there is degradation in technician job engagement, again, leading to high technician rotation. This is because most of the automated solutions are based on task load or a matching between the task to be completed and the skills the technician possesses.

SUMMARY

Embodiments of the present disclosure include a method, computer program product, and system for task dispatching with task resolution error and delay control.

A processor may receive a new ticket from a ticket management system. The processor may classify, in response to receiving the new ticket, one or more metrics to complete the new ticket. The processor may generate a ticket-metric classification that includes a list of users. The processor may identify a question contained in a digital record of the new ticket. The processor may cluster one or more other tickets into metric levels based on information about the question contained in the digital record of the new ticket. The processor may train a metric model using a database of tickets comprising features extracted from information from the ticket management system. The processor may assign the new ticket to a specific user on the list of users.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
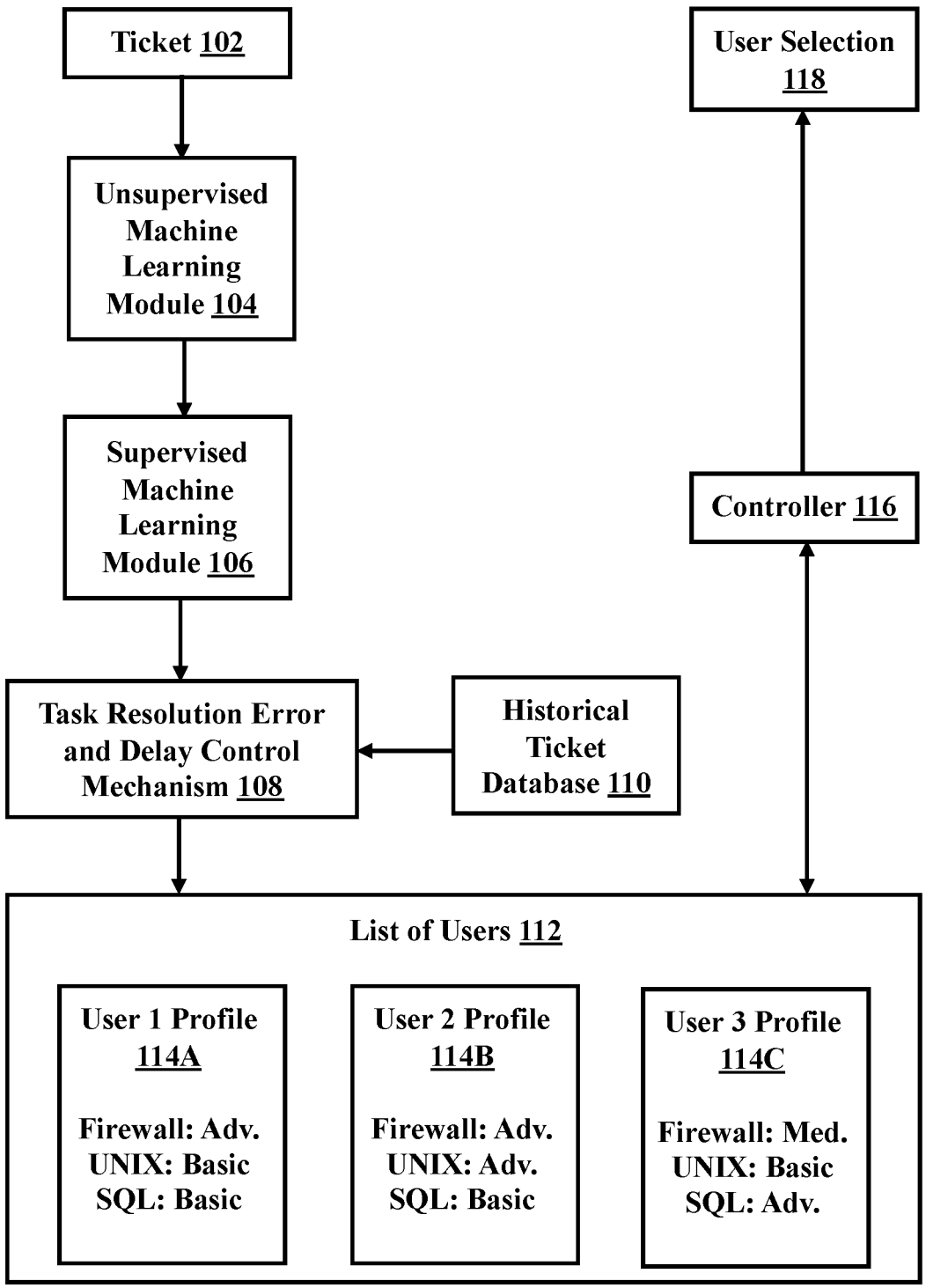
FIG. 1 is a block diagram of an exemplary system for task dispatching with task resolution error and delay control, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of ticket resolution, and more specifically to dispatching a ticket for user metric improvement. While the present disclosure is not necessarily limited to such applications, various aspects of the disclosure may be appreciated through a discussion of various examples using this context.

Dispatching of activities to IT technicians is traditionally performed by a human dispatcher (e.g., controller, etc.) who knows and understands the technicians' skill-sets and capabilities, and matches a technician with (with a ticket based on) the criticality of the activities (in the ticket) and expected delivery time frame (for resolution of the ticket). Such knowledge of a human dispatcher about technicians' skill-sets is increased daily based on response and resolution times from technicians to assigned activities. All this knowledge is accumulated by the human dispatcher, but not often converted into a long term asset for an entity/company, as it is usually wasted/lost with high technician/employee rotations/turnover. Such wasted knowledge could be leveraged to help improve technicians' skill-sets, increase engagement, and focus.

In other cases where dispatching activities are automated by IT systems it is often seen that there is degradation in employee job engagement leading to high employment rotation. This is because most of the automated solutions are based on task load or a matching between the task to be completed and the skills the task solvers/technicians possess.

One of the ways to improve engagement of employees is when they feel their skills are being developed and there are novel types of tasks to be completed. However, giving room for development of skills should not compromise the time-to-resolution of problems that are usually well established in Service Level Agreements (SLAs).

The problem addressed in herein throughout this disclosure is how to properly assign tasks in such a way to increase task solver (e.g., user) engagement via skill development and at the same time keep delivering resolution of problems in time to meet SLAs. In a general sense, the proposed solution utilizes a skill-development-aware task assignment advisor (e.g., a controller, automated controller, etc.) with a task resolution error and delay control mechanism. The task resolution error and delay control mechanism uses time-to-resolution of tickets under different skill sets/levels (e.g., metrics), information on historical failure cases of tasks that were not properly executed (e.g., based on skills and skill levels of people/users who attempted to solve the tasks) and time to detect a problem with a ticket due to improper ticket execution (e.g., a common error a person with a set of skills executing a type of ticket usually shows up after 24 hours). To accomplish such a solution mechanism, such an advisor is implemented using a set of models that need to be coordinated together: unsupervised machine learning using clustering techniques such as k-means to classify skills/metrics and levels of skills/metrics to solve a task; supervised machine learning techniques such as support-vector machine to determine when a ticket resolution can fail based on skill sets/levels (e.g., metrics); and K-nearest neighbor to estimate an execution time of a task depending on skills and skill levels.

Referring now to FIG. 1, a block diagram of a system 100 for task dispatching with task resolution error and delay control, in accordance with aspects of the present disclosure. In some embodiments, the system 100 includes a ticket 102, which may be submitted by a user (e.g., consumer of a computer program/application/product/etc.). The ticket 102 is then sent to an unsupervised machine learning module 104, which may include an unsupervised machine learning model/algorithm that is used to classify metrics (e.g., skills) of a user (e.g., ticket operator, solver, etc.) to solve the ticket.

In some embodiments, the ticket 102 and/or the classifiers associated with the ticket 102 and which were found with the unsupervised machine learning module 104 is sent to a supervised machine learning module 106, which may include a supervised machine learning model/algorithm that is used to predict a time to resolve the ticket based on user metrics (e.g., skills, skillsets, skill levels, etc.).

In some embodiments, the ticket 102 and/or the information from either, or both, the unsupervised machine learning module 104 and the supervised machine learning module 106 is sent to an task resolution error and delay control mechanism 108, which determines which minimum metrics a user is required to have before being given the opportunity to resolve an issue indicated in the ticket 102. For example, the task resolution error and delay control mechanism 108 may identify that there is an advanced SQL issue indicated in the ticket 102 and that a minimum, a user wanting to enhance their SQL abilities and to not violate an SLA, should have a medium understanding of SQL.

In some embodiments, the task resolution error and delay control mechanism 108 is in communication with a historical ticket database 110, which provides the outcomes of previously resolved tickets (e.g., a user with basic understanding of SQL was not able to resolve a ticket with an advanced SQL issue within an SLA timeline).

In some embodiments, the task resolution error and delay control mechanism 108 generates and displays a list of users 112 to a controller 116. As depicted, the list of users 112 includes user profiles 114A-C. In some embodiments, the list of user profiles 114A-C indicates metrics of users who have been screened through the task resolution error and delay control mechanism 108 for wanting to advance their skills in regard to the issue in the ticket 102, and users who could likely solve such an issue within an SLA timeframe. In some embodiments, the controller 116 is either a user or an automated system.

The controller 116 evaluates the list of users 112 and determines from the user profiles 114A-C, which associated user is a best candidate for resolving the issue in the ticket 102. For example, the ticket indicates at a firewall issue needs resolved and the list of users 112 includes the profiles of three users that could each predictably resolve the issue within a specific timeframe. However, the controller 116 may identify that the user associated with the user 3 profile 114C only has a medium understanding of firewall resolutions, and since the other user profiles 114A and 114B indicate the associated users have advanced understandings of firewall resolutions, the controller may assign the ticket 102 to the user associated with the user 3 profile 114C so as to allow the associated user opportunity to increase their skills (e.g., metrics).

In some embodiments, the controller 116 makes a user selection 118, which indicates which user associated with any of the user profiles 114A-C is selected to handle the ticket 102 and the ticket 102 is then sent to the associated user for resolution. In some embodiments, the resolution result (outcome) of the ticket 102 is sent to the historical ticket database 110 to help with future predictions and selections (e.g., the user associated with user 3 profile 114C successfully resolved the issue in ticket 102 and therefore it is predicted that other users with medium firewall skills could solve tickets that have issues related to the one in the ticket 102).

It is noted that the a core novelty in this disclosure is to embed the task resolution error and delay control mechanism 108 as an advisory system that aims at developing skills of users (e.g., employees, ticket solvers, etc.) and which will prevent SLAs from being violated due to less technically suitable users for a particular task to be solved. The task resolution error and delay control mechanism 108 uses a time-to-resolution of tickets under different metrics (e.g., skill sets/levels), information on historical failure cases of tasks (e.g., from the historical ticket database 110) that were not properly executed (e.g., based on skills and skill levels of users who attempted to solve the tasks) and time to detect a problem with a ticket due to improper ticket execution (e.g., a common error is that a user with a set of skills executing a type of ticket usually shows up after 24 hours, which could push the time for ticket resolution passed an SLA timeframe). To accomplish what is disclosed the task resolution error and delay control mechanism 108 is implement using a set of models that need to be coordinated together: unsupervised machine learning (of the unsupervised machine learning module 104) using clustering techniques, such as k-means to classify skills and levels of skills to solve a task; and supervised machine learning techniques (of the supervised machine learning module 106), such as Support Vector Machine to determine when a ticket resolution can fail based on skill sets/levels and/or K-nearest neighbor to estimate execution time of a task depending on skills and skill levels. The advantage of such an implementation discussed herein is that it is aimed at developing skills and enhancing the engagement of employees solving technical problems in IT while being aware about SLAs that cannot be violated.

Figure 2:
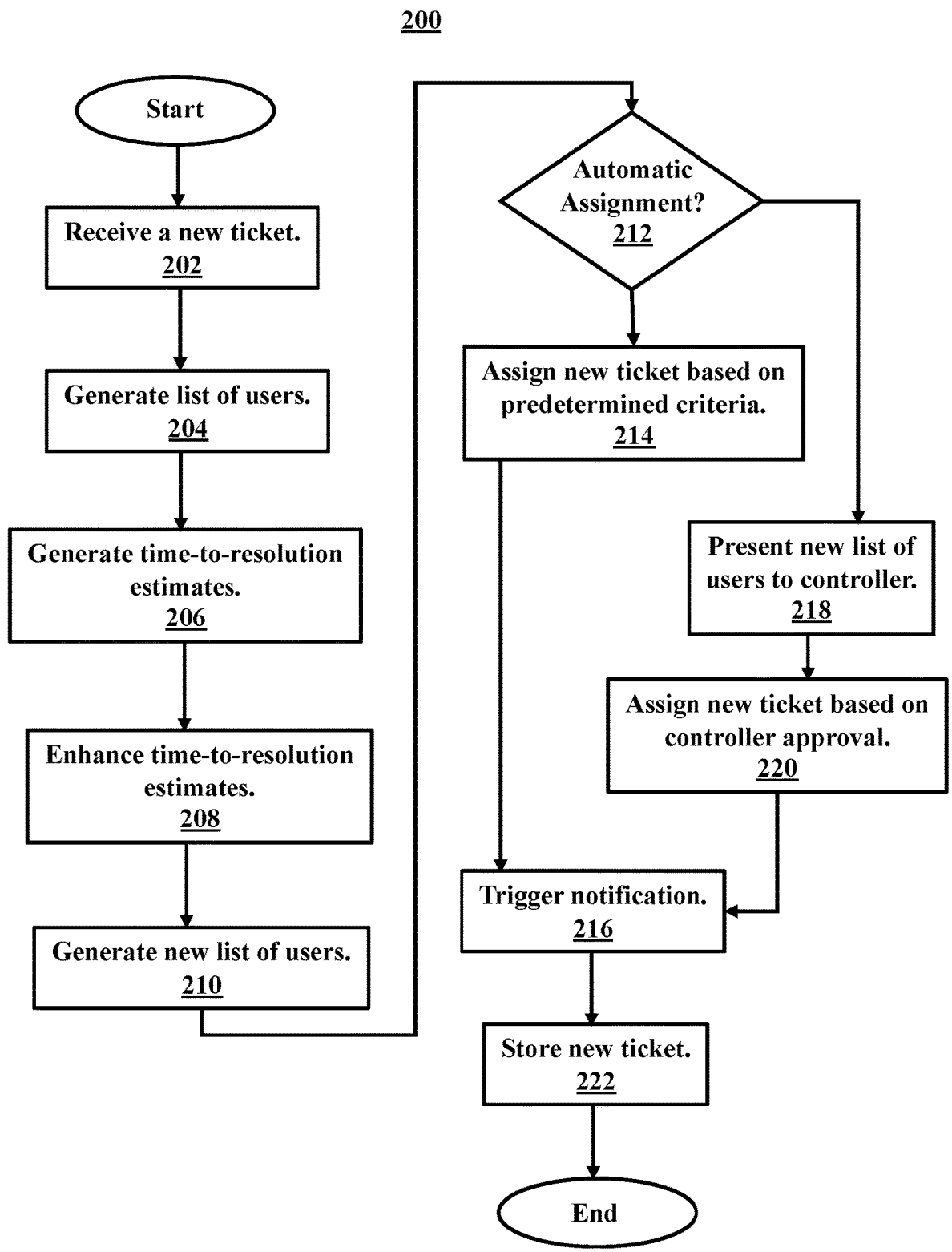
FIG. 2 is a flowchart of an exemplary method for task dispatching with task resolution error and delay control, in accordance with aspects of the present disclosure.

Referring now to FIG. 2, illustrated is a flowchart of an exemplary method 200 for task dispatching with task resolution error and delay control, in accordance with aspects of the present disclosure. In some embodiments, the method 200 may be performed by a processor. In some embodiments, the processor may be a processor within the system 100 and/or any of the components of the system 100.

In some embodiments, the method 200 begins at operation 202, where the processor receives a new ticket. In some embodiments, the method 200 proceeds to operation 204, where the processor generates a list of users. In some embodiments, at operation 204, the generation of the list of users (e.g., first list of task solvers) is based on a ticket-skill classification. In such an embodiment, the processor classifies skills and skill levels required to solve the ticket. A ticket is a digital record that contains information about the problem, who requested that problem to be solved (e.g., client name or ID, when it was opened, its SLA, etc.), which/what is the area of expertise needed to solve the problem (e.g., network, mainframe, storage system, etc.), and a set of fields on its resolution (e.g., who is resolving the ticket, when its resolution started, its status, when it was completed, if it was reopened, etc.). As embodied, historical information of similar tickets and the skills (and levels of skills: basic, intermediate, advanced) of people who resolved such a ticket can be used to generate the list of users. With such information, a machine learning clustering algorithm can be used to cluster tickets in skills and skills levels.

In some embodiments, before the method 200 proceeds to operation 206, it is assumed that a trained model is in place. For such an assumption, such a model needs to be trained using a database of tickets. The training can happen at different time intervals (e.g., once a day or once a week). To generate this model, one possible embodiment is to use an unsupervised machine learning training such as K-means; K-means requires a set of features for generating the model. In this case the following features can be used by extracting information from the ticket management system: area of expertise (e.g., network, mainframe, storage system, etc.); who solved the ticket; skills (e.g., firewall, Unix, security, database, etc.) and skills levels (e.g., basic, intermediate, advanced or on a scaled [0-5], etc.)) of who solved the ticket; SLA (e.g., max time to solve the ticket); if the ticket needed to be reopened due to improper execution; date/time of ticket opening and closing; etc.

In some embodiments, the model can, for example, detect when a medium skilled person in firewall solved the ticket but after a time the ticket had to be reopened, which means that firewall is a relevant skill and therefore it should have more weight in the machine learning clustering algorithm.

Turning back to the method 200, in some embodiments, the method 200 proceeds to operation 206, where the processor (using the model) generates time-to-resolution estimations. For instance, based on a set of task solver candidates, their skills and skill levels, and a database of previously executed tickets, operation 206 will determine estimations of task completions.

To accomplish such a determination of estimations, one possible embodiment is to use an algorithm known as k-Nearest Neighbors (k-NN) to generate the predictions/estimations. The goal of this algorithm is, given a query, to find a predefined number of training samples closest in the feature space to the query and, then, to make a prediction using the k-nearest points found.

In the discussed embodiment, the features of the samples (e.g., tickets) to be used are: area of expertise (e.g., network, mainframe, storage system, etc.); who solved the ticket; skills (e.g., firewall, Unix, security, database, etc.) and skills levels (basic, intermediate, advanced, or a scale) of who solved the ticket; SLA (e.g., max time to solve the ticket); date/time of ticket opening and successfully closed (this is the information required to be predicted for the new ticket), etc. Further, in such an embodiment, to compute distances one having ordinary skills in the art can use Euclidean distance considering the above features.

In some embodiments, the method 200 proceeds to operation 208, where the processor enhances/generates enhanced time-to-resolution estimates. In such an embodiment, with the time estimations (e.g., from operation 206) to complete the tasks on a variety of skills and skill levels, the task resolution error and delay control mechanism (e.g., processor) needs to consider two other data sources:

A. Historical failure cases of improper ticket resolution: Given a candidate with a set of skill set/levels, what is the probability of an improper execution. Here the database of (historical) tickets can be used to get all tickets, and for each group of skill set/levels calculate the probability. A probability (user selection) threshold can be pre-established in the proposed embodiment to consider such failure cases or not when considering a task solver (e.g., user). For example, if 5% of cases generated failures, then such skill set/levels can tolerate such a ticket. Otherwise, such skill set/levels for that ticket should not be considered, in this case, candidates from the list of users of operation 204 that fall into that category should be filtered out.

In some embodiments, to identify likely failure cases, the processor may train a model for identifying failure cases. In practice, such a model needs to be trained using a database of tickets. The training can happen at different time intervals (e.g. once a day or once a week). To create this model, one possible embodiment is to use a supervised machine learning training, such as, Support Vector Machine (SVM). This technique requires a set of features and labels. Here is how such model can be created:

1. Gather information from all tickets to use as a feature of the ML training: (i) area of expertise (e.g., network, mainframe, storage system, etc.); (ii) who solved the ticket; (iii) skills (e.g., firewall, Unix, security, database, etc.) and skills levels (e.g., basic, intermediate, advanced) of who solved the ticket; (iv) SLA (e.g., max time to solve the ticket); (v) Date/time of ticket opening and closing;

2. Identifying if/that the ticket successfully closed (e.g., no reopening status was recorded), then use this information as a label of the SVM training; and 3. After running the SVM training, generated is a model that, based on a ticket, can determine the probability of failure to execute the ticket based on skills and the time used to complete the ticket.

B. Time to detect a problem with similar tickets due to improper ticket resolution using similar tickets and skill sets/levels. The other important component is when a ticket is closed, but it was not actually resolved properly, how much time it takes for a problem related to the ticket to show up. This is relevant because depending on the set of skill sets/levels, it is common for a less skilled person to commit similar errors on similar types of tickets. The task resolution error and delay control mechanism needs to know how much time is left for a more skilled person to be triggered (e.g., assigned) to solve the ticket. Therefore, it is important not only to know the time the person who is developing a skill can spend on a ticket, but if that ticket is not solved properly, when the problem will appear so that a more skilled person can take over the ticket.

To calculate such a time, the database of tickets can also be used. One possible embodiment is to loop through all tickets similar to the new ticket, for each one of those tickets, collect information on the skill set/levels of task solvers when the tickets were closed, and calculate the average (or maximum) time between the time the ticket was closed and when it was reopened for all groups of skill sets/levels under consideration.

Turning back now to the method 200, in some embodiments, the method 200 proceeds to operation 210, where the processor generates a new list of users. In some embodiments, the new list of users/task solvers is generated considering SLA constraints, (desired) skill development, and error/delay control. In some embodiments, operation 210 will gather the list of users from operation 204, and for each task solver candidate, considering his/her current skill sets/levels, and desired skill set/levels to be develop, a new list of task solver (ts) candidates is generated using the following algorithm:

"NewList=empty
For ts in the list of task solvers
    If ts.estimatedExecTime+ts.estimatedReopeningTime+skilledTs.estimatedExectime<=ticket.SLA
        NewList.append(ts)
Return NewList".

In some embodiments, the method 200 proceeds to decision block 212, where it is determined/verified if the problem assignment decision is to be executed automatically or under the controller (e.g., dispatcher) approval/reviewing process. In some embodiments, depending on the level of the severity of the ticket, no dispatcher approval would be required, so the advisory system could be proactive and assign the ticket automatically to a user for resolution.

In some embodiments, if it is determined at decision block 212 that the assignment of the ticket should be automatically done, the method 200 proceeds to operation 214. At operation 214, the processor assigns the new ticket based on predetermined/pre-established criteria (e.g., skills, time-to-resolution, etc.) for candidate/user selection. In some embodiments, the criteria for selecting a user may include an availability or round-robin for ticket skill learning.

In some embodiments, if it is determined at decision block 212 that the assignment of the ticket should not be automatically done, the method 200 proceeds to operation 218. At operation 218, the processor presents the new list of users to a controller for approval/revision. In some embodiments, the new list of users from operation 210 will be presented to the controller in the form of a list that includes a sorting of users/candidates and has a roadmap matching each candidate with the required skills first.

In some embodiments, the method 200 proceeds to operation 220, where the processor assigns the new ticket based on controller approval. In some embodiments, this can be via email, chat system, or the ticket management system (e.g., 100 of FIG. 1) itself.

In some embodiments, after either operation 214 and/or operation 220, the method 200 proceeds to operation 216. At operation 216, the processor triggers a notification. In some embodiments, the notification is for a more skilled user/solver to act. In such an embodiment, it is the responsibility of the task resolution error and delay control mechanism not only to help determine the task solver list (e.g., list of users), but also, monitor whenever a more skilled task solver needs to work on a ticket to avoid SLA violation. There are alternative embodiments that could be had in/at operation 216:
    If ticket was not closed yet and ts.alreadySpentTime>ts.estimatedExecTime: send notification to more skilled task solver; or
    If ticket was closed and ts.usedTime+ts.estimatedReopeningTime>ticket.SLA: send notification to more skilled task solver.

In some embodiments, the method proceeds to operation 222, where the processor stores the new ticket (in the historical database to be used for more model training, etc.). In such an embodiment, when the ticket is completed by the task solver, the processor evaluates skill development of the task solver and updates information on his/her skill development plan (e.g., if the ticket was correctly resolved, increase proficiency of skill, etc.); and the ticket information is recorded in the ticket management system to be consumed for training the machine learning models. In some embodiments, after operation 222, the method 200 may end.

It is noted that operations 204, 206, 208, 210, and 216 are the included operations that differentiate that is what is disclosed herein from any other ticket management systems/methods.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
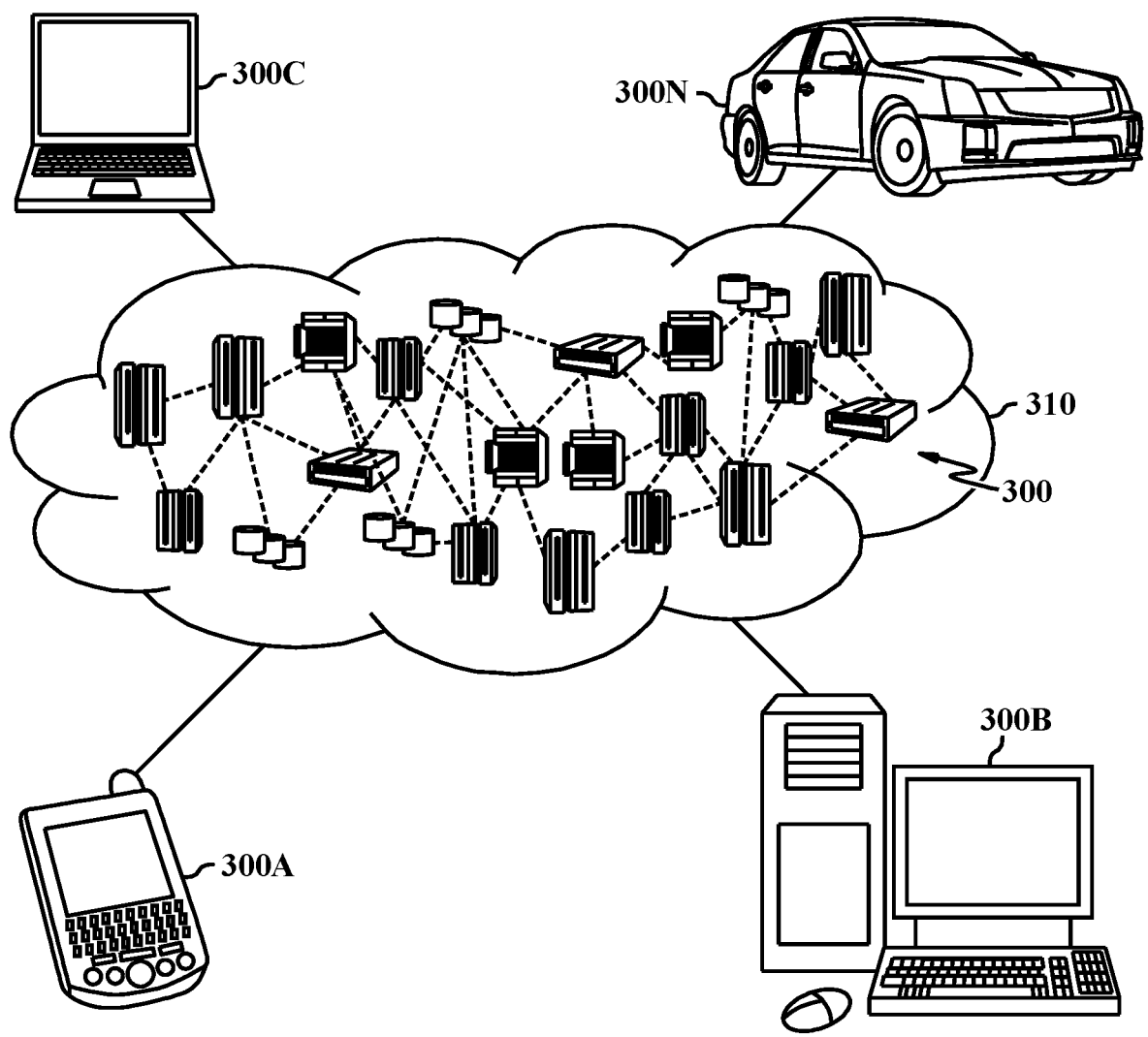
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
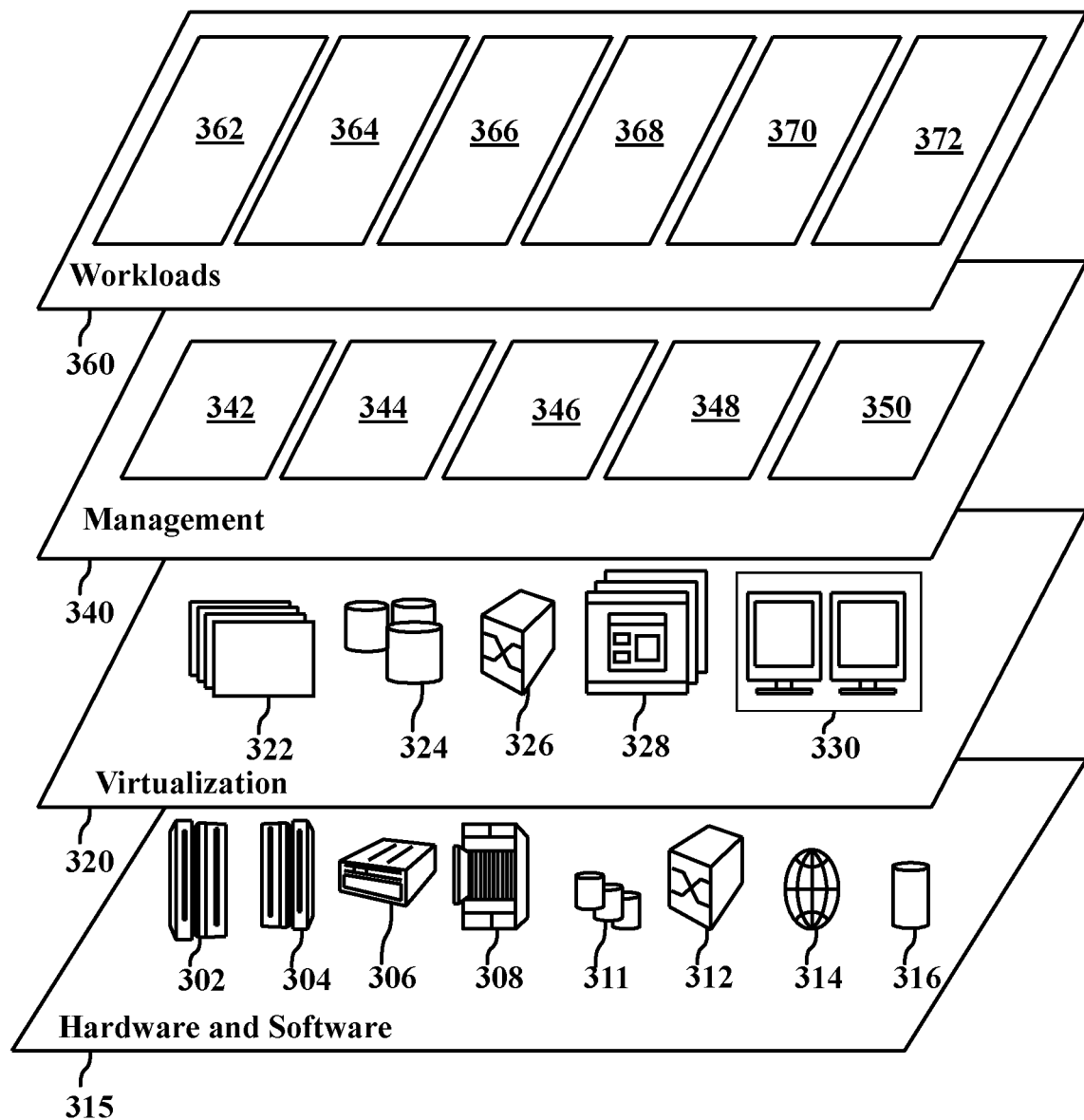
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided:

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and task dispatching with task resolution error and delay control 372.

Figure 4:
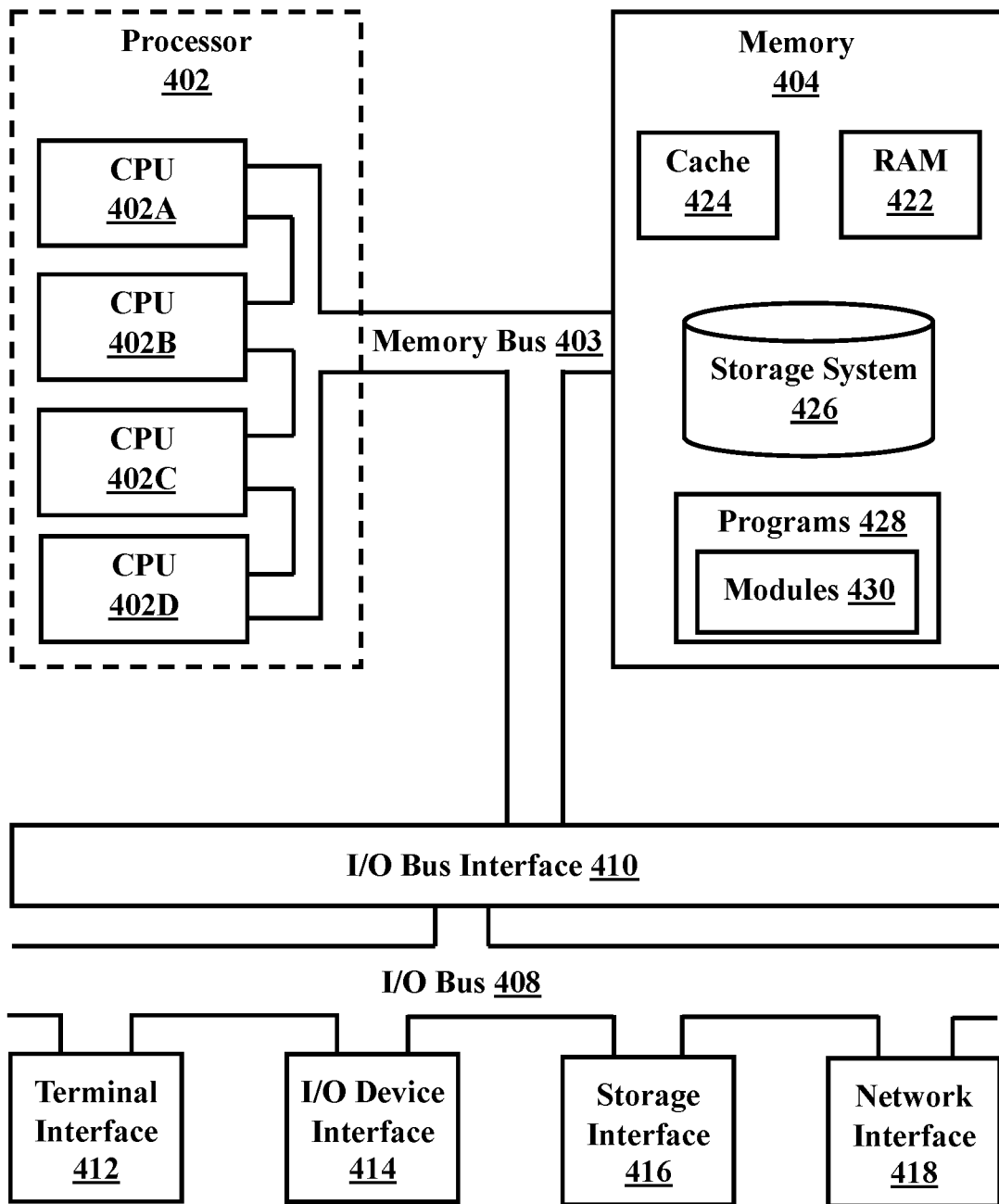
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method for task dispatching with task resolution error and delay control, the computer-implemented method comprising:
   receiving, by a processor, a new ticket from a ticket management system;
   classifying, in response to receiving the new ticket, one or more metrics to complete the new ticket;
   generating a ticket-metric classification that includes a list of users;
   identifying a question contained in a digital record of the new ticket;
   clustering one or more other tickets into metric levels based on information about the question contained in the digital record of the new ticket, wherein clustering the one or more tickets includes utilizing an unsupervised machine learning technique;
   training a metric model for identifying failure cases using a database of tickets comprising features extracted from information in tickets obtained from the ticket management system, wherein said training the metric model comprises using a Support Vector Machine (SVM) to implement machine learning the metric model using the extracted features as input to the metric model and generating a probability of failure to execute the ticket as output of the metric model, wherein the extracted features include skill levels of users who executed the tickets, times used to execute the tickets, and whether the tickets successfully closed;
   running the trained metric model to predict the probability of failure to execute the ticket for users having skill levels;
   using the predicted probability of failure to remove users, from the list of users, whose skill levels are associated with a predicted probability of failure exceeding a specified probability threshold; and
   assigning the new ticket to a specific user on the list of users.

2. The method of claim 1, further comprising:
   generating one or more time-to-resolution estimations using a set of previous users, metrics associated with the previous users, and a database of previously executed tickets, wherein the time-to-resolution estimations are used to further generate an estimation of time to complete the new ticket.

3. The method of claim 2, further comprising:
   identifying a time to detect an issue with similar tickets to the new ticket due to improper ticket resolution of the similar tickets and metric levels using historical failure cases of improper ticket resolutions;

generating, in response to the identifying, an enhanced estimation of the time to complete the new ticket; and generating a new list of users using constraints of an associated service level agreement, the enhance estimation.

4. The method of claim 1, further comprising:

assigning the new ticket to the list of users using a predetermined criteria for user selection including availability and round-robin for ticket metric learning;

presenting the list of users to a controller for acceptance, wherein the list of users is hierarchical with one or more candidates above a user selection threshold are presented above other users, and wherein the specific user is listed first; and assigning, automatically, the new ticket to the specific user based on approval by the controller.

5. The method of claim 4, further comprising:

identifying a service level agreement violation will occur; and reassigning, automatically, the new ticket to a second user in the list of users.

6. The method of claim 4, further comprising:

identifying that the specific user completed the new ticket;

updating, in response to the new ticket being completed by the specific user, a metric development plan associated with the specific user; and recording information associated with the new ticket in the ticket management system used for training a machine learning model.

7. A system for task dispatching with task resolution error and delay control, the system comprising: a memory; and a processor in communication with the memory, the processor being configured to perform operations comprising:

receiving a new ticket from a ticket management system;

classifying, in response to receiving the new ticket, one or more metrics to complete the new ticket;

generating a ticket-metric classification that includes a list of users;

identifying a question contained in a digital record of the new ticket;

clustering one or more other tickets into metric levels based on information about the question contained in the digital record of the new ticket, wherein clustering the one or more tickets includes utilizing an unsupervised machine learning technique;

training a metric model for identifying failure cases using a database of tickets comprising features extracted from information in tickets obtained from the ticket management system, wherein said training the metric model comprises using a Support Vector Machine (SVM) to implement machine learning the metric model using the extracted features as input to the metric model and generating a probability of failure to execute the ticket as output of the metric model, wherein the extracted features include skill levels of users who executed the tickets, times used to execute the tickets, and whether the tickets successfully closed;

running the trained metric model to predict the probability of failure to execute the ticket for users having skill levels;

using the predicted probability of failure to remove users, from the list of users, whose skill levels are associated with a predicted probability of failure exceeding a specified probability threshold; and assigning the new ticket to a specific user on the list of users.

8. The system of claim 7, the processor being further configured to perform operations comprising:

generating one or more time-to-resolution estimations using a set of previous users, metrics associated with the previous users, and a database of previously executed tickets, wherein the time-to-resolution estimations are used to further generate an estimation of time to complete the new ticket.

9. The system of claim 8, the processor being further configured to perform operations comprising:

identifying a time to detect an issue with similar tickets to the new ticket due to improper ticket resolution of the similar tickets and metric levels using historical failure cases of improper ticket resolutions;

generating, in response to the identifying, an enhanced estimation of the time to complete the new ticket; and generating a new list of users using constraints of an associated service level agreement, the enhance estimation.

10. The system of claim 7, the processor being further configured to perform operations comprising:

assigning the new ticket to the list of users using a predetermined criteria for user selection including availability and round-robin for ticket metric learning;

presenting the list of users to a controller for acceptance, wherein the list of users is hierarchical with one or more candidates above a user selection threshold are presented above other users, and wherein the specific user is listed first; and assigning, automatically, the new ticket to the specific user based on approval by the controller.

11. The system of claim 10, the processor being further configured to perform operations comprising:

identifying a service level agreement violation will occur; and reassigning, automatically, the new ticket to a second user in the list of users.

12. The system of claim 10, the processor being further configured to perform operations comprising:

identifying that the specific user completed the new ticket; updating, in response to the new ticket being completed by the specific user, a metric development plan associated with the specific user; and recording information associated with the new ticket in the ticket management system used for training a machine learning model.

13. A computer program product for task dispatching with task resolution error and delay control comprising a computer readable storage medium having program instructions embodied therewith, the program instructions executable by a processor to cause the processor to perform operations, the operations comprising:

receiving a new ticket from a ticket management system;

classifying, in response to receiving the new ticket, one or more metrics to complete the new ticket;

generating a ticket-metric classification that includes a list of users;

identifying a question contained in a digital record of the new ticket;

clustering one or more other tickets into metric levels based on information about the question contained in the digital record of the new ticket, wherein clustering the one or more tickets includes utilizing an unsupervised machine learning technique;

training a metric model for identifying failure cases using a database of tickets comprising features extracted from information in tickets obtained from the ticket management system, wherein said training the metric model comprises using a Support Vector Machine (SVM) to implement machine learning the metric model using the extracted features as input to the metric model and generating a probability of failure to execute the ticket as output of the metric model, wherein the extracted features include skill levels of users who executed the tickets, times used to execute the tickets, and whether the tickets successfully closed;

running the trained metric model to predict the probability of failure to execute the ticket for users having skill levels;

using the predicted probability of failure to remove users, from the list of users, whose skill levels are associated with a predicted probability of failure exceeding a specified probability threshold; and assigning the new ticket to a specific user on the list of users.

14. The computer program product of claim 13, the operations further comprising:

generating one or more time-to-resolution estimations using a set of previous users, metrics associated with the previous users, and a database of previously executed tickets, wherein the time-to-resolution estimations are used to further generate an estimation of time to complete the new ticket.

15. The computer program product of claim 14, the operations further comprising:

identifying a time to detect an issue with similar tickets to the new ticket due to improper ticket resolution of the similar tickets and metric levels using historical failure cases of improper ticket resolutions;

generating, in response to the identifying, an enhanced estimation of the time to complete the new ticket; and generating a new list of users using constraints of an associated service level agreement, the enhance estimation.

16. The computer program product of claim 13, the operations further comprising:

assigning the new ticket to the list of users using a predetermined criteria for user selection including availability and round-robin for ticket metric learning;

presenting the list of users to a controller for acceptance, wherein the list of users is hierarchical with one or more candidates above a user selection threshold are presented above other users, and wherein the specific user is listed first; and assigning, automatically, the new ticket to the specific user based on approval by the controller.

17. The computer program product of claim 16, the operations further comprising:

identifying a service level agreement violation will occur; and reassigning, automatically, the new ticket to a second user in the list of users.

* * * * *